Feb. 13, 1962 B. MICHAELS 3,021,039
LOOP RESTORING MOTION PICTURE PROJECTOR
Filed March 20, 1959 4 Sheets-Sheet 1

INVENTOR.
Bruno Michaels
BY
Robert F. Michle Jr.
Att'y

INVENTOR.
Bruno Michaels

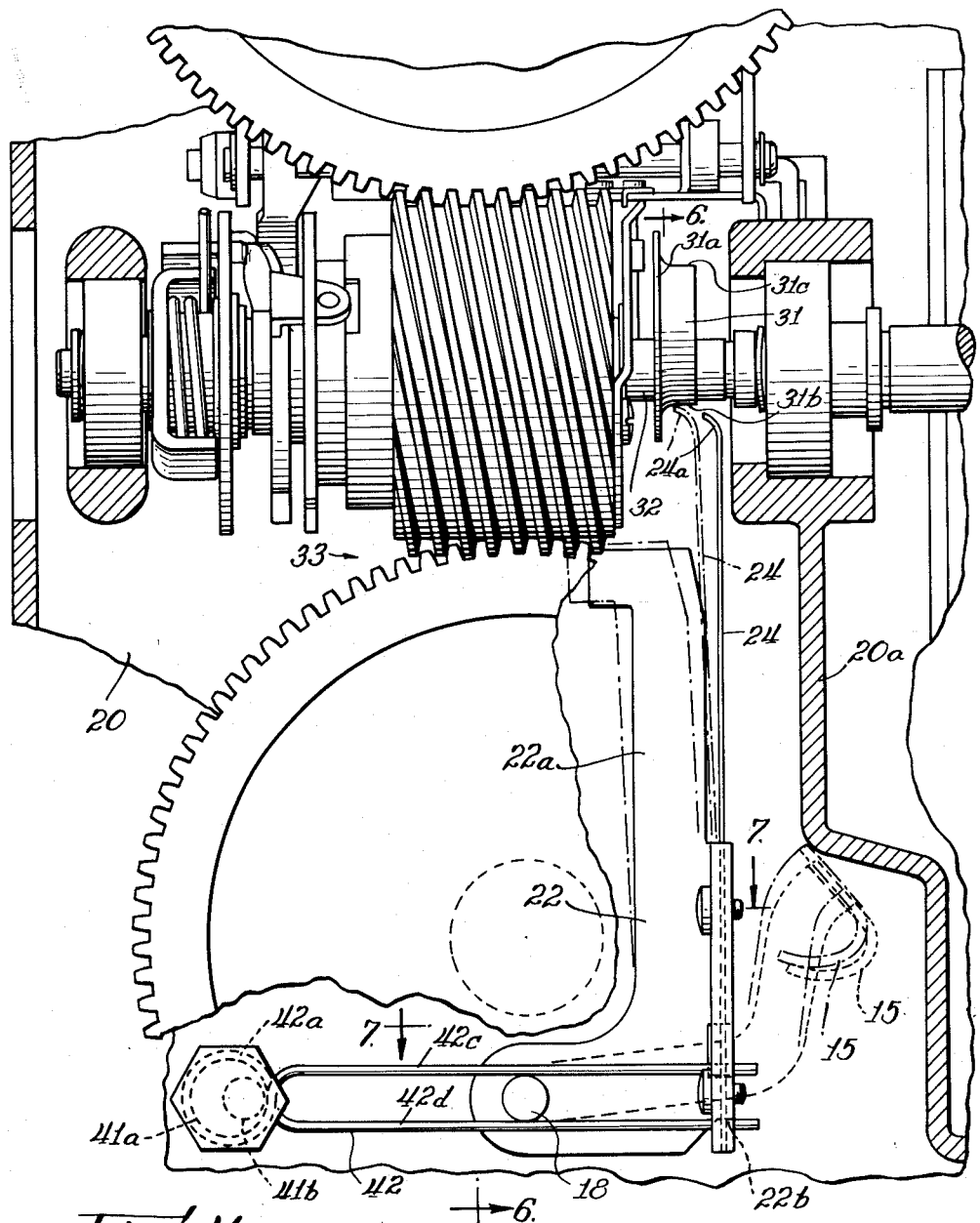

Feb. 13, 1962  B. MICHAELS  3,021,039
LOOP RESTORING MOTION PICTURE PROJECTOR
Filed March 20, 1959  4 Sheets-Sheet 4
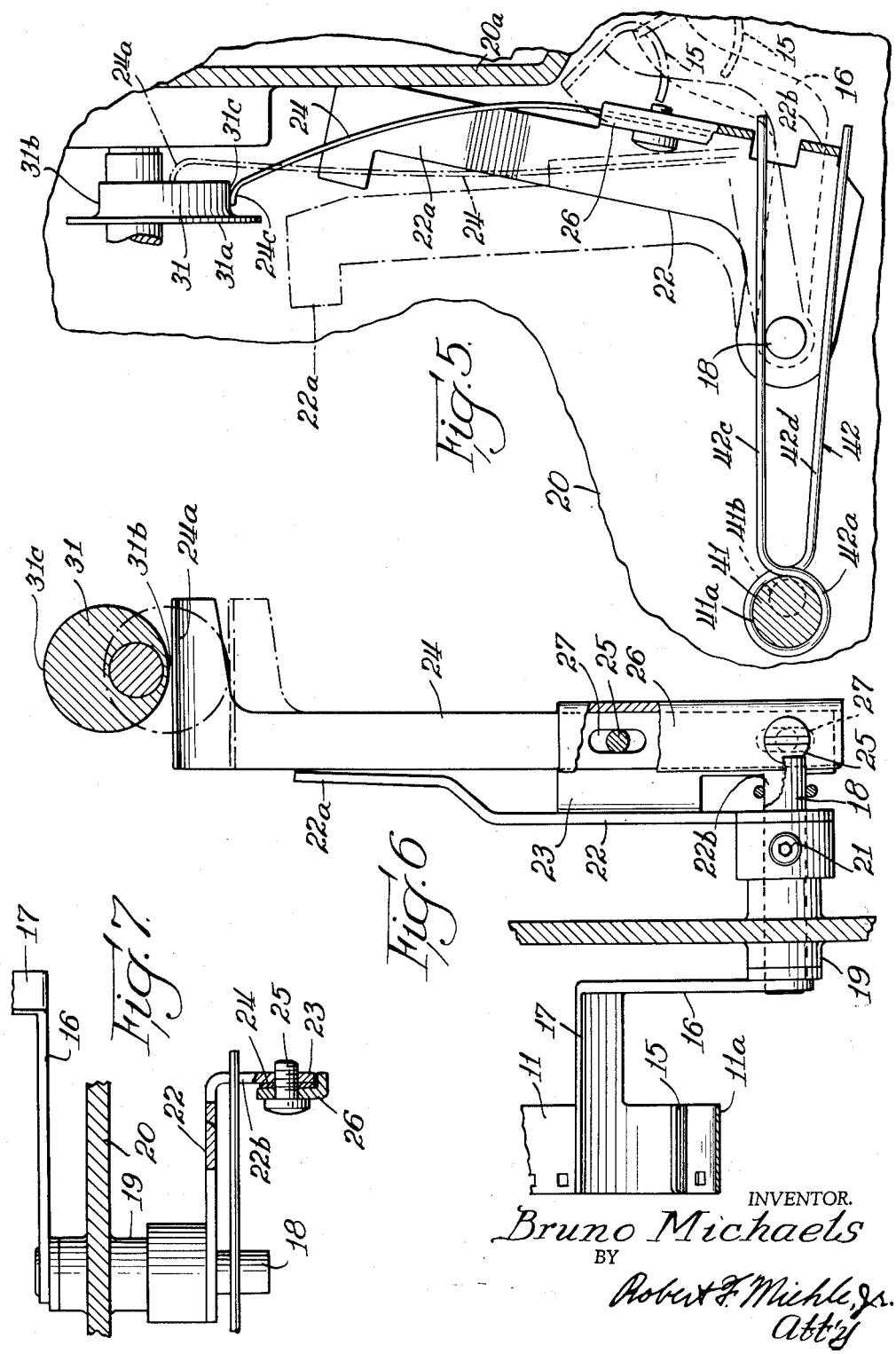
INVENTOR.
Bruno Michaels
BY
Robert F. Miehle, Jr.
Atty

United States Patent Office 3,021,039
Patented Feb. 13, 1962

3,021,039
LOOP RESTORING MOTION PICTURE PROJECTOR
Bruno Michaels, Chicago, Ill., assignor to Bell & Howell Company, Chicago, Ill., a corporation of Illinois
Filed Mar. 20, 1959, Ser. No. 800,674
4 Claims. (Cl. 226—36)

This invention relates to a loop restoring motion picture projector, and more particularly to an automatically operated loop restorer for a motion picture projector.

An object of the invention is to provide a new and improved loop restorer for a motion picture projector.

Another object of the invention is to provide a loop restorer resiliently driven when operated to urge film into a loop after the loop has been lost.

Yet another object of the invention is to provide a projector having a loop restorer including a film engaging member urged to a position out of contact with the film when a loop is present and engaged by the film when the loop is lost to actuate a resilient drive which then moves the member to a loop restoring position.

Still another object of the invention is to provide a loop restoring member which is resiliently urged toward a loop restoring position when the loop of a film is lost.

A further object of the invention is to provide a projector having gate means, a shuttle and a lower sprocket together with a drive normally operable to drive the shuttle and the sprocket to advance film at the same average speed with a loop therebetween and a member engageable by the film when the loop is lost to move a resilient cam follower into engagement with a cam which then urges the member toward a loop restoring position.

In the drawings:

FIG. 4 is an enlarged, fragmentary side elevation view in partial section of the drive of the loop restorer;

FIG. 5 is a fragmentary view similar to FIG. 4 with elements of the loop restorer in different positions than shown in FIG. 4;

FIG. 6 is an enlarged vertical section taken along line 6—6 of FIG. 4; and

FIG. 7 is an enlarged vertical section taken along line 7—7 of FIG. 4.

The invention provides a loop restorer for a projector in which a loop restoring member is operable when engaged by the film to start a resilient drive which urges the member toward a loop restoring position. The resilient drive may include an eccentric cam together with a resilient cam follower which is moved by the restoring member into operative engagement with the cam when the loop is lost and resiliently drives the member toward its loop restoring position.

Figure 1:
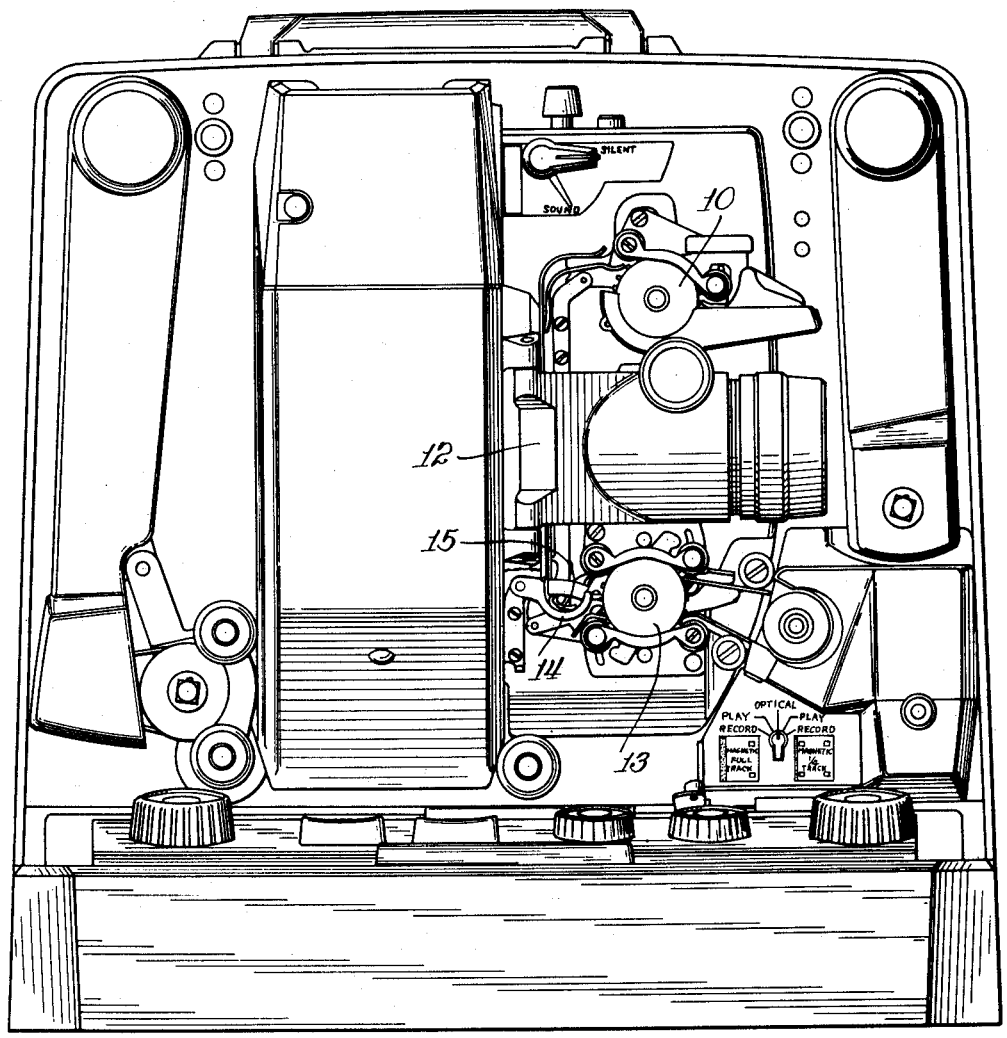
FIG. 1 is a side elevation view of a loop restoring motion picture projector forming a specific embodiment of the invention.

Referring now in detail to the drawings, FIG. 1 shows motion picture projector having an upper sprocket 10 which feeds film 11 (FIG. 2) toward a gate mechanism 12. The gate mechanism 12 is of a known type and associated therewith is a shuttle (not shown) which during forward operation advances the film intermittently downwardly through the gate, and a lower sprocket 13 advances the film continuously from the gate mechanism. For most satisfactory operation of the projector, a loop 11a in the film is provided between the intermittently feeding gate mechanism 12 and the continuously feeding lower sprocket 13, and this loop is initially formed by a lower loop former 14 which forms a part of a self threading device disclosed and claimed in co-pending application Serial No. 783,248, filed December 29, 1958, by Bruno Michaels for "An Automatic Film Threading Device" and assigned to the same assignee as the instant invention. During normal operation of the projector, the loop 11a is present and hangs below and out of contact with a curved shoe 15 of a loop restorer. If desired, a roller may be substituted for the shoe. However, when a portion of the film which has several defective perforations travels to the gate mechanism 12, the shuttle sometimes misses its feed of the film and the loop is lost.

Figure 2:
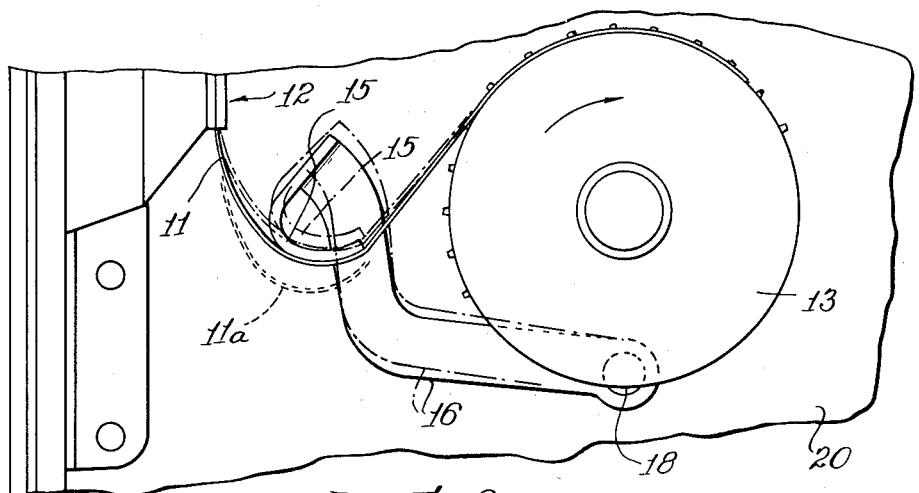
FIG. 2 is an enlarged, fragmentary side elevation of a portion of the loop restorer of the projector shown in FIG. 1.

When the loop 11a is lost, the film bight moves upwardly into engagement with the shoe 15 and presses the shoe from its normal position shown in full lines in FIG. 2, to its actuated position shown in broken lines in FIG. 2. The shoe 15 in the embodiment shown is rigid but may also conceivably be of flexible material, and is connected rigidly to a rigid arm 16 by a rigid shank 17 (FIG. 6). The arm 16 is rigidly fixed to a pin or shaft 18 journalled in bearing 19 of an upright frame member 20. An actuating arm 22 is keyed adjustably to the shaft 18 by set screw 21 (FIG. 6) and has a stop portion 22a and a laterally projecting tab or bracket 23. The lower end portion of a leaf spring 24 is adjustably secured to the bracket 23 by clamping screws 25 and a clamping plate 26. The screws 25 threaded into tapped bores in the bracket and projecting through elongated slots 27 in the leaf spring.

The spring 24 is a resilient cam follower and extends upwardly from the arm 22, and the upper end or shoe 24a of the spring is curved toward a flange 31a of an eccentric cam 31. The cam 31 has a low or dwell portion 31b and a high or lobe portion 31c, and is keyed to a shaft 32 rotated continuously during operation of the projector and forming a part of the drive of the shuttle and sprockets 10 and 13, which drive also includes gearing 33.

A pin 41 (FIGS. 4 and 5) having a groove 41a eccentric to a threaded portion 41b thereof serves to adjustably mount a looped base 42a of a generally U-shaped wire spring 42 on the frame 20. The looped base 42a fits in the groove 41a of the pin 41 and the threaded portion 41b of the pin 41 is screwed into a tapped bore in the frame. Arms 42c and 42d of the springs 42 bracket the shaft 18, and extend beyond the bracket 23 over opposite sides of a tab 22b (FIG. 7) extending laterally of the arm 22.

Figure 3:
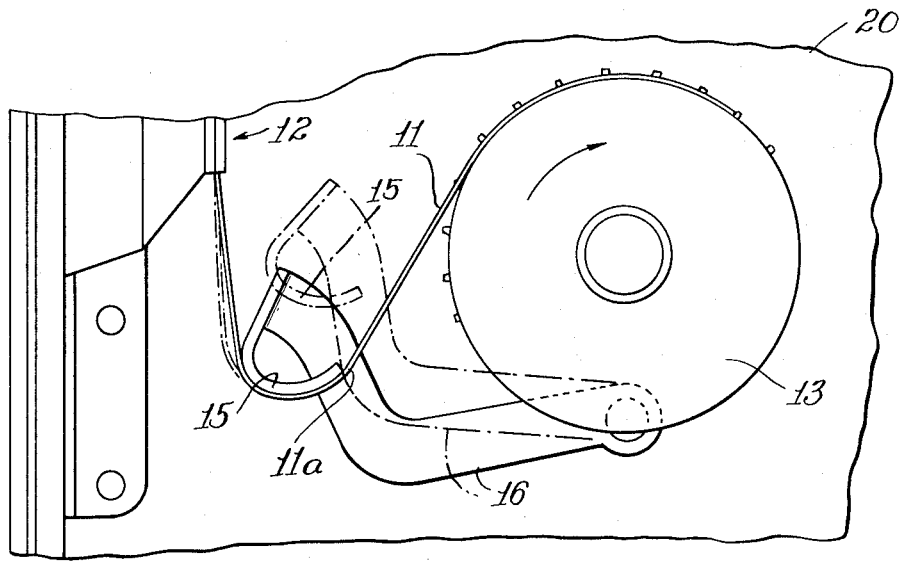
FIG. 3 is a view similar to FIG. 2 with a loop restoring member in a loop restoring position.

During normal running operation of the projector with the portion of the film 11 having no damaged perforations being fed by the gate mechanism 12, the film has a loop 11a (FIG. 3) as it is advanced by the gate mechanism and the lower sprocket 13 which loop varies slightly in size because of the intermittent film advance of the gate mechanism. The loop 11a hangs entirely out of contact with the shoe 15, the spring 42 being in the position thereof shown in FIG. 4 and holding the shoe 15 in the full-line position thereof shown in FIG. 2 while the loop 11a is shown in dashed lines in FIG. 2.

When the loop 11a is lost by non-feed of the gate mechanism 12, the film moves into contact with the shoe 15 and the tension of the film moves the shoe 15 and arm 16 clockwise, as viewed in FIG. 2, to the broken line positions of the shoe and arm 16 shown in FIG. 2 against the action of the wire spring 42. This swings the arm 22 in a counter-clockwise direction, as viewed in FIG. 5, and the leaf spring 24 is swung to the left. If, at this time, the low portion 31b of the cam 31 is down so that it is adjacent to the shoe 24a of the spring 24, the shoe 24a is swung from its full-line position of FIG. 4 at one side of the cam 31 to its broken line position under the cam and toward the flange 31a of the cam. Then, as the cam rotates, it drives the shoe 24a downwardly, the flange 31a keeping the shoe from sliding off the cam, and the spring 24 urges the arm 22 in a clockwise direction, as viewed in FIG. 4. If the film is not restrained as during the period engagement thereof by the shuttle of the gate mechanism 12, the spring 24 moves the shoe 15 from its actuated position shown in broken lines in FIG. 3 to its loop restoring position shown in full lines in FIG. 3, the loop restoring position of the arm 22 being shown in full lines in FIG. 5, the stop 22a engaging wall 20a at this time to limit travel of the arm 22 and shoe 15. However, if the shuttle is in engagement with the film at the start of the loop restoring operation, the spring 24 merely flexes until the shuttle releases the film and then the loop is restored. Thus, damage to the film perforations is prevented. The spring 42 swings the elements 15, 16, 22 and 24 to their normal or retracted positions when the dwell or low portion 31b is moved down to the shoe 24a.

If the loop 11a is lost and the shoe 15 is moved to its actuated position while the lobe 31c of the cam 31 is down, the shoe 24a is merely urged against the side of the cam 31, as illustrated in phantom lines in FIG. 5. Then, when the dwell 31b is moved down to the shoe 24a, the shoe 24a is swung by stress of the spring 24 under the cam, and the loop restoring drive is effected.

The above described loop restorer is simple in construction and sure in operation. It resiliently restores the loop so that damage to the film perforations during loop restoring is prevented.

While the invention is thus described, it is not wished to be limited to the precise details described, as changes may be readily made without departing from the spirit of the invention.

What is claimed is:

1. In a projector including a film gate, means for advancing a film, a frame, a lower sprocket on the frame for advancing film from the gate means and a drive including a drive shaft for driving the gate means and the lower sprocket, the improvement comprising an eccentric cam rotated on a horizontal axis by the drive and having a flange on one side thereof, a pin journaled in the frame for pivotal movement on a horizontal axis normal to the plane in which the axis of the cam lies, an arm keyed to the pin at one side of the frame and having a loop restoring shoe, a second arm keyed to the pin at the other side of the frame, a leaf spring having one end fixed to the second arm and the other end extending free and curved, and spring means urging the arms and the pin toward normal positions in which the shoe is in the loop of the film between the gate and the lower sprocket and out of contact with the film and the leaf spring extends upwardly to one side of the cam, said spring means serving to permit the arms and the pin to be swung by pull of the film on the shoe, when the loop is lost, to an actuated position in which the curved end of the leaf spring is swung under the cam toward the flange and the leaf spring is at an angle relative to the cam such that compressive engagement of the leaf spring by the cam tends to urge the end of the leaf spring toward the flange, said spring means also permitting the arms and the pin to be moved by the cam and the leaf spring to positions in which the shoe restores the loop.

2. The projector of claim 1 wherein said spring means includes a generally U-shaped wire spring, the second arm having a tab provided with a hole for receiving one end of one side of the wire spring and a slot for receiving the end of the other side of the wire spring, and means for clamping the base of the wire spring to the frame.

3. In a projector including an upright frame member, vertically disposed gate means, a sprocket mounted on one side of the frame member for advancing film from the lower end of the gate means with a loop therebetween and drive means including a continuously rotated shaft extending horizontally along the other side of the frame member, the improvement comprising a pin journaled in the frame member below the shaft, a feeler arm keyed to the pin at said one side of the frame member and having a shoe portion disposed in the loop of the film, a second arm keyed to the pin at said other side of the frame member, double-acting spring means biasing the second arm toward a normal position in which the shoe portion is just out of contact with the loop of the film and permitting movement of the second arm to a second position by the shoe portion when the loop is lost and the film presses the shoe portion, the double-acting spring means also permitting movement of the second arm to a loop restoring position in which the shoe portion pushes the film into a loop, a leaf spring secured at the lower end thereof to the second arm in a generally vertical position and having a laterally extending portion at the upper end thereof, a cylindrical cam keyed to the shaft and having an unflanged side and a flange at the other side thereof and also having a dwell and a lobe, the second arm when in the said normal position thereof serving to hold the leaf spring in a position in which said laterally extending portion thereof is laterally spaced from the cam and just below the path of the dwell of the cam and serving when moved to said second position to move said laterally extending portion of the leaf spring under the cam into the path of the lobe of the cam and against the flange of the cam, whereby the laterally extending portion of the leaf spring is trapped in engagement with the cam and the lobe of the cam moves the second arm to said loop restoring position through the leaf spring, and stop means preventing movement of the second arm beyond said loop restoring position.

4. In a projector including an intermittent film feeder and a continuous film feeder, a loop restorer comprising a pivotally mounted arm having a film engaging shoe, means urging the arm to an intermediate position in which the shoe is out of engagement with a normal loop of the portion of the film between the feeders and permitting movement of the arm in one direction to an actuated position by force on the shoe from the film when the loop is lost and also permitting movement of the arm in the opposite direction from its intermediate position to a restoring position in which the shoe restores the loop, a continuously rotatable cam, resilient cam follower means comprising a leaf spring having an end portion for engaging the cam and mounted on the arm in a position in which the end portion is at one side of the cam when the arm is in its intermediate position and is urged into the path of the cam when the arm is moved to its actuated position for urging the arm to its restoring position, and means operable to disengage the cam follower from the cam after the loop is restored.

References Cited in the file of this patent

UNITED STATES PATENTS

| 1,395,119 | Kucharski | Oct. 25, 1921 |
| 2,418,361 | McNabb | Apr. 1, 1947 |

FOREIGN PATENTS

| 18,676 | Great Britain | of 1913 |
| 976,430 | France | Oct. 25, 1950 |
| 513,983 | Italy | Feb. 8, 1955 |